(12) United States Patent
Johnson et al.

(10) Patent No.: US 6,467,502 B1
(45) Date of Patent: Oct. 22, 2002

(54) MANIFOLD AND METHOD OF MAKING SAME

(75) Inventors: Timothy L. Johnson, Erie, PA (US); Christopher C. Knoll, Fairview, PA (US); Anthony Medina, Erie, PA (US)

(73) Assignee: Snap-Tite Technologies, Inc., Wilmington, DE (US)

( * ) Notice: Subject to any disclaimer, the term of this patent is extended or adjusted under 35 U.S.C. 154(b) by 0 days.

(21) Appl. No.: 09/626,049

(22) Filed: Jul. 26, 2000

(51) Int. Cl.[7] .............................................. F15B 13/044
(52) U.S. Cl. ................................................... 137/596.17
(58) Field of Search .................................. 137/596.17

(56) References Cited

U.S. PATENT DOCUMENTS

| | | | | |
|---|---|---|---|---|
| 3,682,962 A | * | 8/1972 | Good ........................... | 137/870 |
| 3,991,788 A | * | 11/1976 | Kull ............................ | 137/870 |
| 4,250,924 A | * | 2/1981 | Sakakibara et al. .... | 137/596.17 |
| 4,559,971 A | * | 12/1985 | Bradshaw ............... | 137/596.17 |
| 5,090,441 A | * | 2/1992 | Richmond ......... | 137/596.17 X |
| 5,127,434 A | * | 7/1992 | Kline et al. ............ | 137/596.17 |
| 6,202,672 B1 | * | 3/2001 | Ellis et al. ............... | 137/596.2 |

\* cited by examiner

*Primary Examiner*—Gerald A. Michalsky
(74) *Attorney, Agent, or Firm*—Woodling, Krost & Rust

(57) ABSTRACT

A manifold assembly and method of making the same is disclosed. The manifold assembly is preferably made of a polymer. A mold is used to make the manifold portion of the manifold assembly such that small diameter passageways and valve seats are formed enabling use of small solenoids. Since pressure is applied to small diameter plunger seals (valves) driven by solenoid plungers, small solenoids may be used because the force on the solenoid plungers is correspondingly low. The manifold assembly is comprised of a manifold portion and a plug portion. The manifold portion, as disclosed, has an inlet port for the supply of air pressure. An inlet housing in which an inlet solenoid is housed, a supply port for supplying air to or exhausting air from a reservoir, and an exhaust housing in which an exhaust solenoid is housed are connected to a chamber. The chamber which interconnects the housings and supply port is enclosed by the plug portion which is ultrasonically welded to the manifold portion.

5 Claims, 22 Drawing Sheets

MANIFOLD AND METHOD OF MAKING SAME

FIELD OF THE INVENTION

The invention is a manifold assembly and the method of making it. One use of the manifold assembly is to control the height of a truck's seat. The manifold assembly may be used in many other instances where small solenoids are employed in the manifold assembly.

BACKGROUND OF THE INVENTION

Small solenoids produce small plunger forces. Small solenoids may be used in a manifold where low forces are applied to the plungers or to plunger seals attached to the plungers. Pressure applied to a surface area results in a force on that surface. Therefore, it is desirable in the design of manifolds to minimize the area of the plunger seal upon which pressure is applied. Plunger seals attached to solenoid plungers are used to control the flow of gas or other fluid through orifices (having cross-sectional areas) in manifolds.

Manifolds are generally molded in one piece and usually require machining. One piece molded manifolds require a longitudinal pin and multiple transverse pins to be used as part of the mold. The transverse pins are attached to the longitudinal pins and it is these transverse pins which form the passageways and orifices in the manifold through which fluid/gas flows. Small orifices are closed with small plunger seals having small surface areas. Since pressure is applied to these small plunger seal surface areas, the operators (i.e., solenoids) driving the plunger seals do not have to be very large to resist the forces applied to the plunger seals. Pins in a one piece mold are difficult to positionally control and they can be damaged by the incoming polymeric material which is injected under high pressure and high velocity.

The instant invention solves the aforementioned problems.

SUMMARY OF THE INVENTION

A manifold assembly is disclosed having two portions, a manifold portion and a plug portion ultrasonically welded together. Sometimes herein just the word manifold may be used to denote the manifold assembly. A multiple piece mold is used to form the manifold portion such that small orifices and passageways are formed which are subject to process pressure. By reducing the cross-sectional area of the orifices, forces on the plunger seals attached to solenoid plungers are reduced enabling the use of smaller operators (i.e. solenoids).

The manifold assembly comprises a body having an inlet port, an inlet housing, a supply port, an exhaust housing, and a chamber. The chamber interconnects the inlet housing, the supply port, and the exhaust housing. The inlet port is interconnected by a first passageway with the inlet housing. The inlet housing is interconnected by a second passageway to the chamber. The exhaust port is also interconnected by a third passageway to the chamber. The exhaust port is interconnected by a fourth passageway to the atmosphere external to the manifold. The chamber is formed by a plug portion ultrasonically welded to the manifold portion of the manifold assembly.

An inlet solenoid with a first plunger seal resides in the inlet housing and an exhaust solenoid with a second plunger seal resides in the exhaust housing. The inlet housing includes a first valve seat and the exhaust housing includes a second valve seat. The first plunger seal acts and seals against the first valve seat. The second plunger seal acts and seals against the second valve seat. The second passageway interconnects the chamber and the inlet housing and a third passageway interconnects the chamber and the exhaust housing.

A first tube connector is affixed to the inlet port and a second tube connector is affixed to the supply port. The tube connectors are inserted in the manifold portion prior to the complete cooling of the manifold portion after it is removed from the mold. This enables easy assembly of the tubes to the manifold. The supply port supplies air or other fluid to a reservoir. When air or other fluid is removed from the reservoir, it flows through the supply port and through the chamber, through the third passageway, through the exhaust housing past the second valve and through the fourth passageway to atmosphere. Preferably the manifold body and the plug are made from an acetal resin sold under the trademark Delrin® which is registered to E. I. DuPont de Nemours.

Preferably each of the aforementioned second and fourth passageways have a length to diameter ratio less than 4. Specifically it is desired that the length-diameter ratio of each of the second and fourth passageways between the inlet housing and the chamber and between the exhaust housing and the exterior of the manifold be less than 4.

The inlet housing and the exhaust housing each include a valve seat. Concentric with these valve seats are the aforementioned second and fourth passageways. These passageways have a small diameter which enables the use of a small solenoid in the respective housings. A small solenoid may be used because the pressures are applied to a small plunger seal area resulting in a relatively small force which must be overcome by the respective solenoid. The small diameter passageways and orifices are made by a process for making the manifold portion.

The manifold assembly is manufactured from two parts, a manifold portion and a plug portion ultrasonically welded together. A multiple piece mold is employed to make the manifold portion of the manifold assembly.

A bottom mold portion, a top mold portion, a first rotatable mold portion, a second rotatable mold portion, an inlet mold portion, a right slide portion, and a left slide portion are secured together and form a cavity therein. The bottom mold portion and the top mold portion are in contact in one place. The bottom mold portion contacts the first rotatable mold portion forming: (1) the first passageway interconnecting the inlet port and the inlet housing; and, (2) a second passageway interconnecting the inlet housing and the chamber. The bottom mold portion contacts the second rotatable mold portion forming: (1) the third passageway interconnecting the chamber and the exhaust housing; and, (2) a fourth passageway interconnecting the exhaust housing and the atmosphere external to the manifold. Once the mold is secured together a polymer is injected into the cavity. The polymer, once injected, is then allowed to partially cool. The rotatable mold portions are removed by rotating them and then the top portion of the mold is removed. The rotatable mold portions must be rotated because threads are formed in the inlet housing and exhaust housing therearound during the molding process. The right and left slide portions separate. The top and bottom portions of the mold are then removed.

While the injected polymer is still very warm and has not yet taken its final room temperature size and shape, the plug portion is ultrasonically welded to the manifold portion enclosing the chamber which creates the manifold assembly.

It is an object of the present invention to provide a manifold assembly having valve seats in solenoid housings with concentric passageways therethrough having small diameters.

It is a further object of the present invention to provide a manifold assembly having eccentric passageways connecting into or out of the solenoid housing cavities.

It is a further object of the present invention to provide a manifold assembly manufactured by ultrasonically welding two pieces together, a manifold portion and a plug portion.

It is a further object of the present invention to provide a manifold assembly having at least one tube connector secured therein.

It is a further object of the present invention to provide a manifold assembly having at least one barbed end connector integral therewith.

It is a further object of the present invention to provide a manifold assembly which uses small, low power solenoids for closing orifices in the manifold.

It is a further object of the present invention to provide a manifold assembly which employs passageways having a length to diameter ratio less than or equal to 4.

Further objects of the invention will be understood when reference is made to the Brief Description of the Drawings, the Description of the Invention, and the Claims which follow hereinbelow.

BRIEF DESCRIPTION OF THE DRAWINGS

FIG. 3A also illustrates the relationship between the length and diameter of the passageway.

FIG. 13 illustrates the inlet solenoid valve in the open position and the exhaust solenoid valve in the closed position.

FIG. 13A illustrates the inlet solenoid valve in the closed position and the exhaust solenoid valve in the open position.

A better understanding of the invention will be had by referring to the Description of the Invention and Claims which follow hereinbelow.

DESCRIPTION OF THE INVENTION

Figure 1:
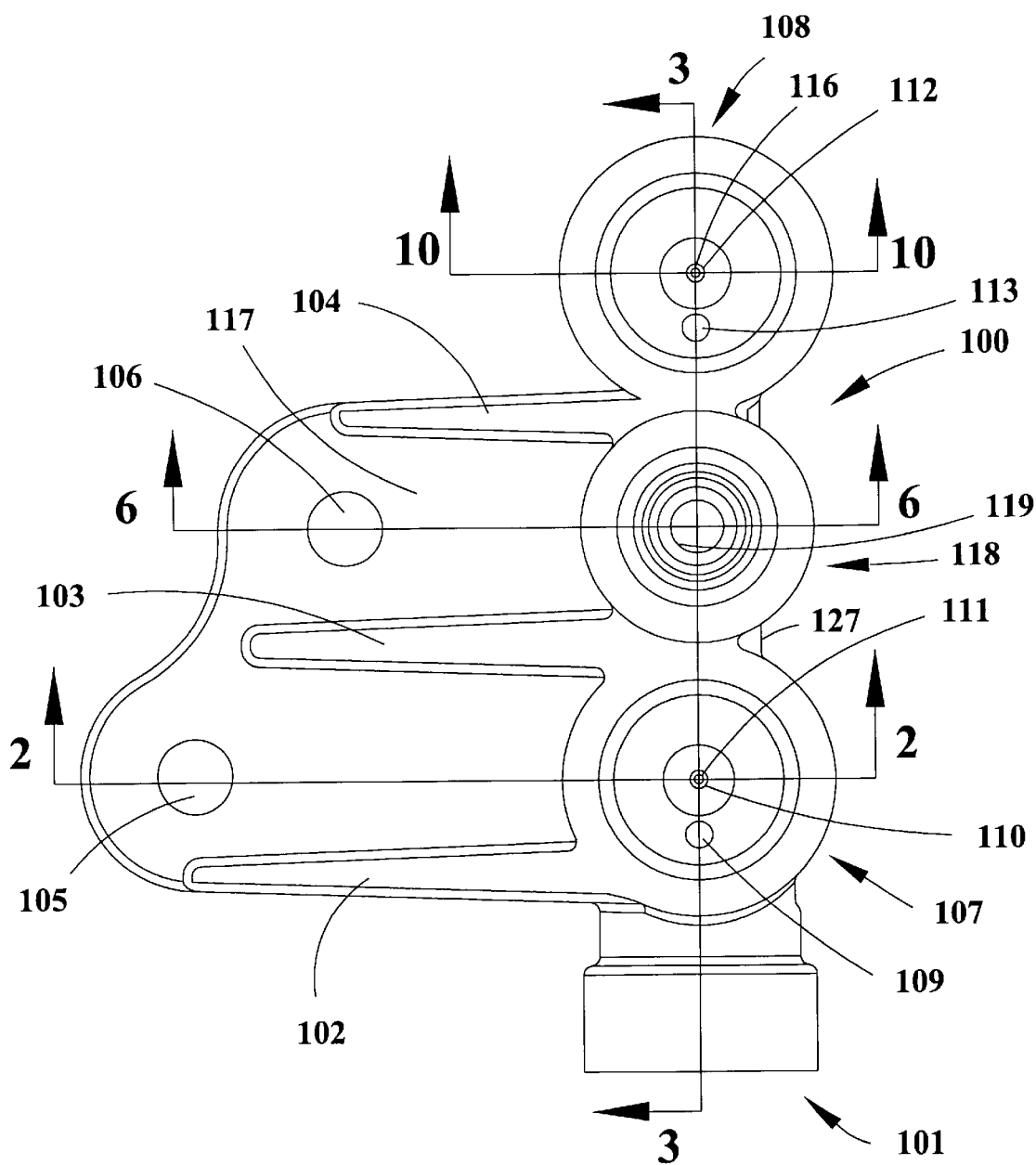
FIG. 1 is a top plan view of the manifold portion of the manifold assembly.

FIG. 1 is a top plan view of the manifold portion 100 of the manifold assembly 1300. See, FIG. 13 which illustrates the manifold assembly in cross-section. Inlet port 101 supplies air from an air pressure source (not shown). The inlet port 101 has a stepped bore having stepped portions 123, 124, 125, and 126. See, FIGS. 3 and 13. Structural ribs 102, 103, and 104 provide strength to the manifold assembly. See, FIG. 1. Bolt holes 105 and 106 secure the manifold assembly 1300 to a frame. The particular manifold assembly illustrated in the drawings may be used in connection with raising and lowering of a seat in a truck. Other uses will be apparent to those skilled in the art. Many housings may be employed in other embodiments of the invention.

Figure 3:
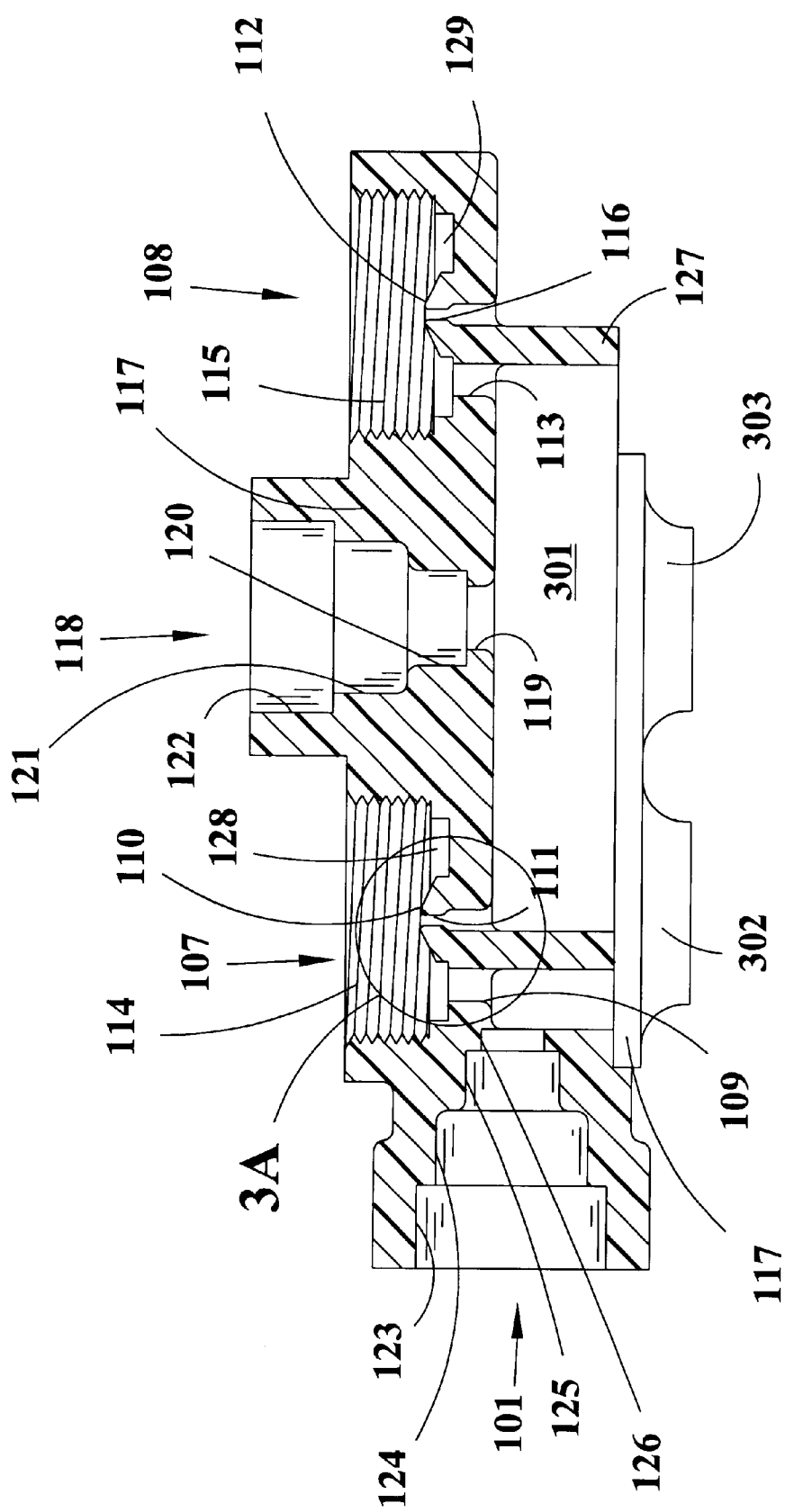
FIG. 3 is a cross-sectional view of the manifold portion of the manifold assembly taken along the lines 3—3 of FIG. 1.

The supply port 118 supplies air to a reservoir (not shown). Similarly the supply port 118 may exhaust air from the reservoir. The supply port 118 to the reservoir comprises a bore having stepped portions 119, 120, 121 and 122 best viewed in FIGS. 3 and 13. FIG. 3 is a cross-sectional view of the manifold portion taken along the lines 3—3 of FIG. 1. Referring to FIGS. 1 and 3, reference numeral 127 represents the upper portion of the chamber 301. Still referring to FIGS. 1 and 3, inlet solenoid housing 107 and exhaust solenoid housing 108 are illustrated. Reference numeral 114 indicates threads on the inlet solenoid housing 107 and reference numeral 15 indicates threads on the exhaust solenoid housing 108. First air passageway 109 supplies air from the inlet port 101 to the inlet solenoid housing 107. Valve seat 110 on inlet solenoid housing 107 is illustrated best in FIG. 3.

Valve seat 112 in the exhaust solenoid housing 108 is best illustrated in FIG. 3. Third air passageway 113 interconnects chamber 301 to the exhaust solenoid housing 108.

Figure 3A:
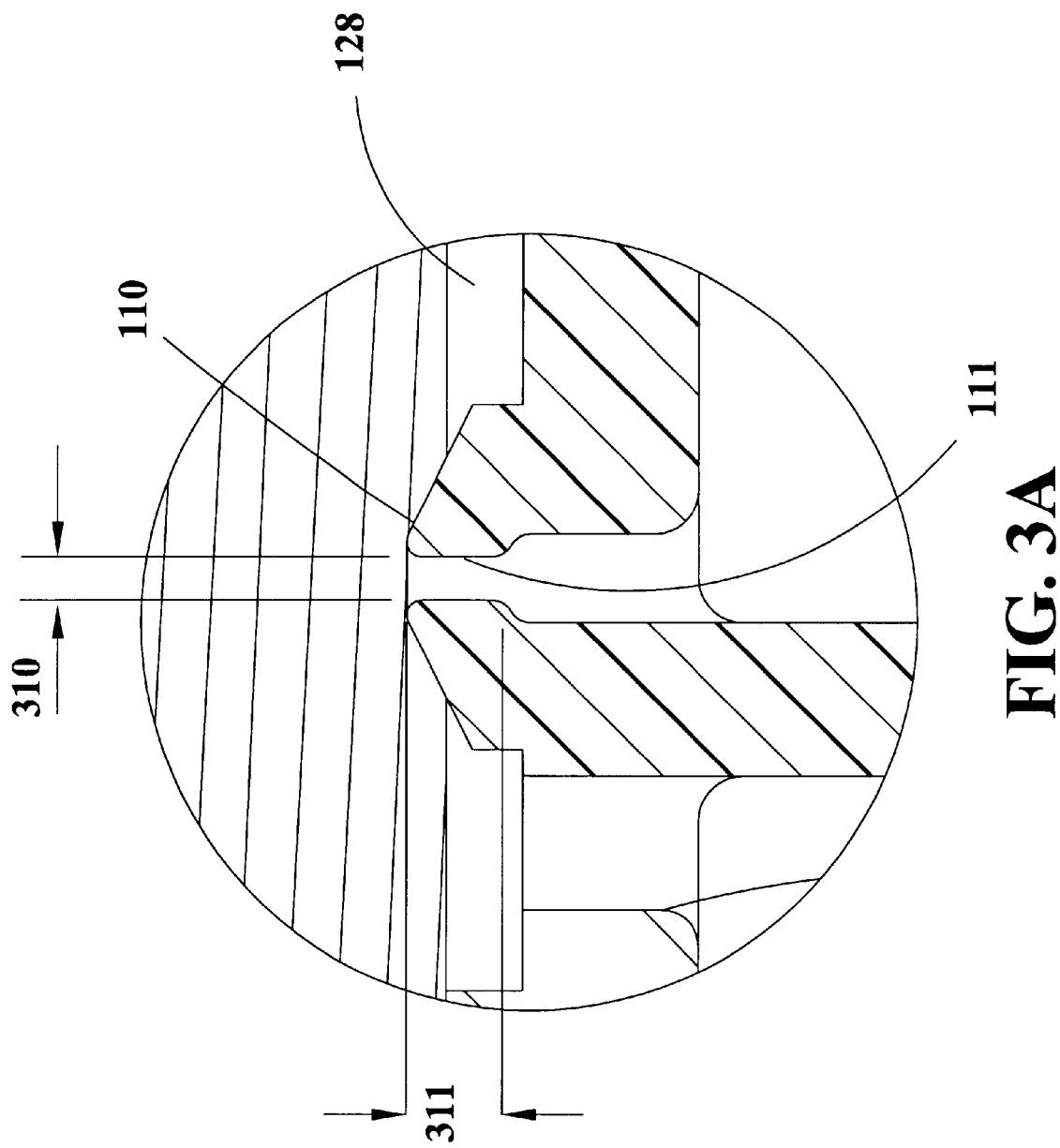
FIG. 3A is an enlarged view of a portion of FIG. 3 illustrating a passageway and a valve seat.

Second air passageway 111 interconnects the inlet solenoid housing 107 with the chamber 301. Exhaust solenoid housing 108 is interconnected to the atmosphere external to the manifold by fourth air passageway 116. Both of these passageways 111, 116 have small length to diameter ratios. Preferably these length to diameter ratios are less than or equal to 4. The diameter that is referred to in this discussion is the minimum diameter of the passageways 111, 116 illustrated in FIG. 3 at the points where the passageway extends up to the valve seats 110 and 112. The length that is meant in this discussion is the length from the opening of the passageways (at the valve seats) to the point where the opening extends into either the chamber 301 (in the case of second passageway 111) or to the atmosphere (in the case of fourth passageway 116). FIG. 3A is an enlarged view of a portion of FIG. 3. FIG. 3A illustrates the diameter 310 of the second passageway 111 and reference numeral 311 illustrates the length of the second passageway 111. The diameter 310 is desirably 0.031 inches. Reference numeral 117 as indicated in the various drawing figures refers to the body of the manifold portion 100.

Referring to FIG. 3 reservoir 128 is illustrated as an annular volume about the valve seat 110 in inlet solenoid housing 107. Reservoir 129 is similarly illustrated as an annular volume about the valve seat 112 in the exhaust solenoid housing 108.

Figure 2:
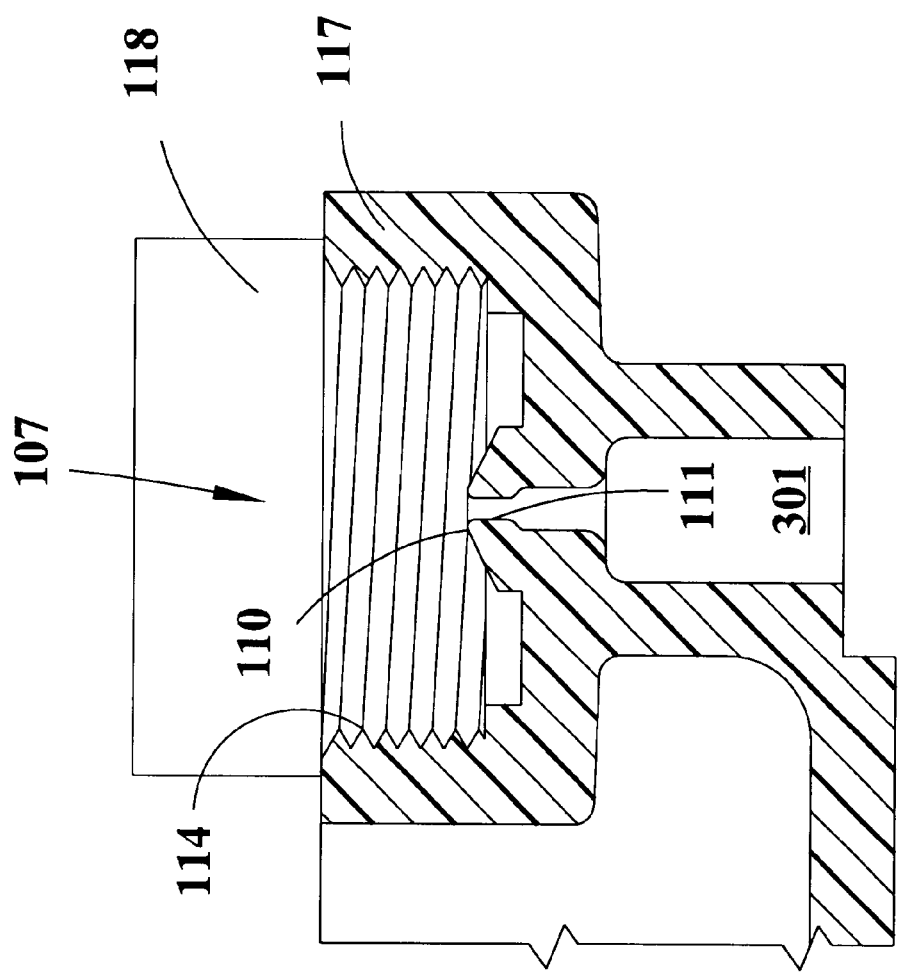
FIG. 2 is a cross-sectional view of a portion of the manifold portion of the manifold assembly taken along the lines 2—2 of FIG. 1.

FIG. 2 is a cross-sectional view of the manifold portion taken along the lines 2—2 of FIG. 1. FIG. 2 is an enlarged view. It will be noted that FIG. 2 is a cross-sectional view of a portion of the manifold portion taken along the lines 2—2 of FIG. 1. FIG. 2 provides a good view of the valve seat 110 and the passageway 111 from the inlet solenoid housing to the chamber 301. Chamber 301 is closed by the plug 1101 as viewed in FIG. 11 when the plug 1101 is ultrasonically welded to the manifold portion.

Figure 11:
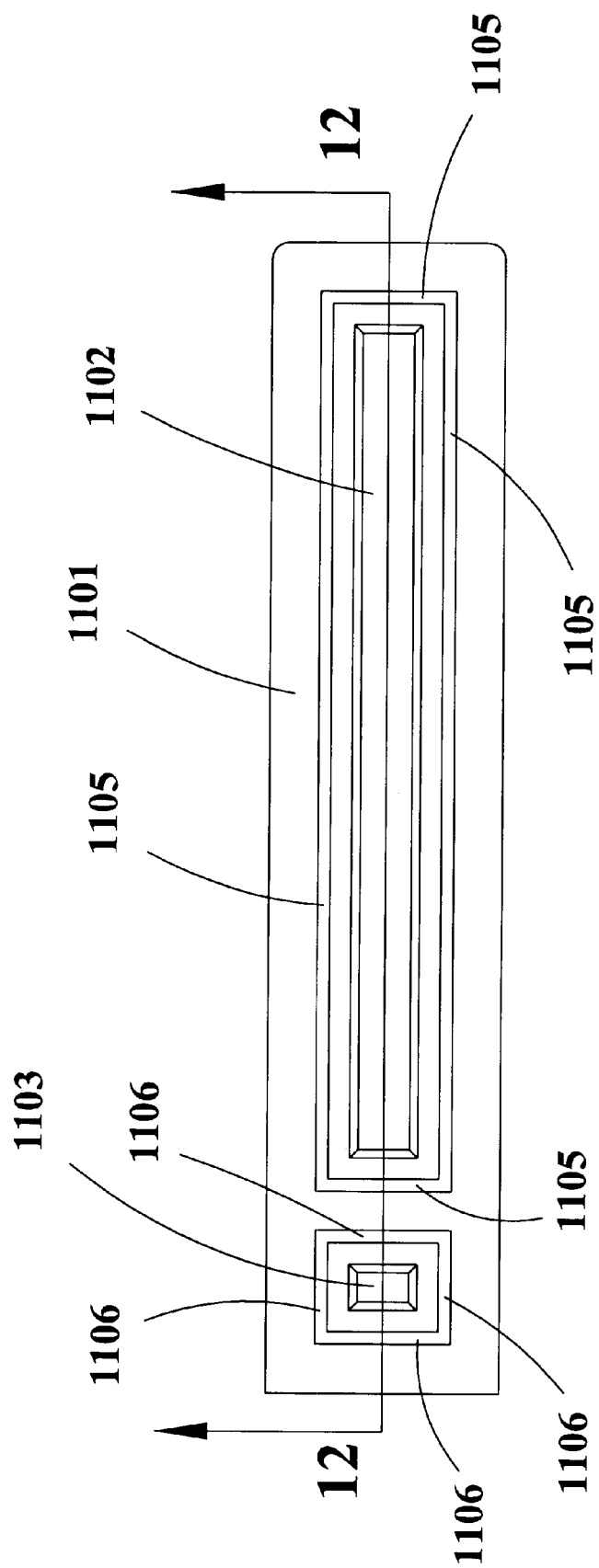
FIG. 11 is a top view of the plug portion of the manifold assembly.
Figure 12:
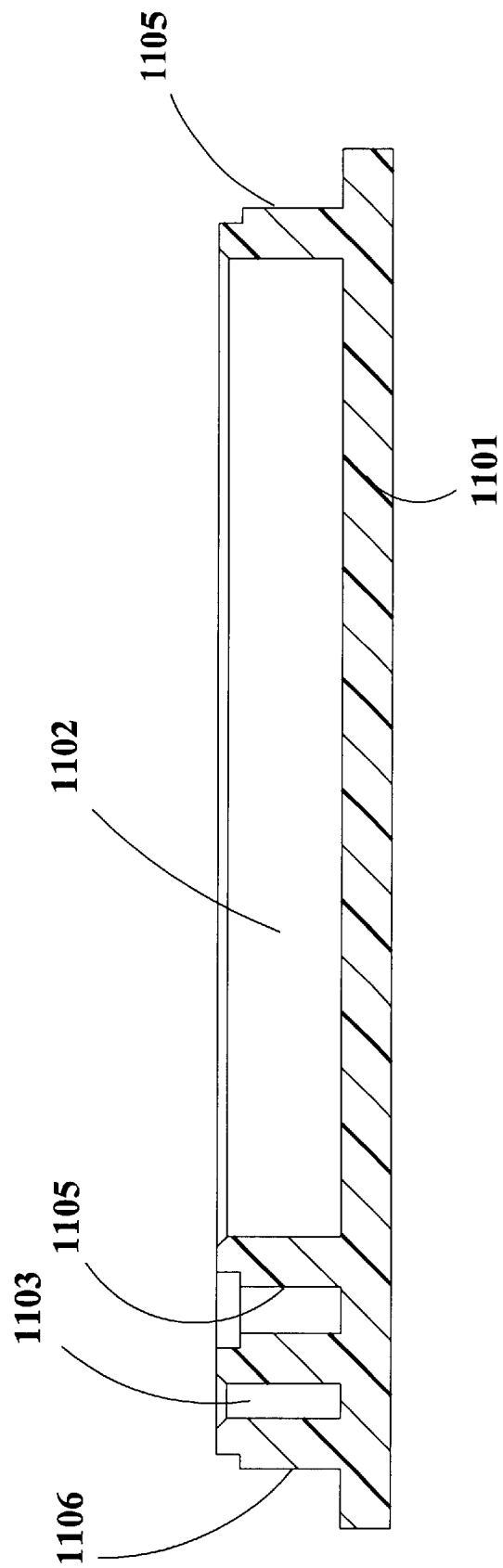
FIG. 12 is a cross-sectional view of the plug portion of the manifold assembly taken along the lines 12—12 of FIG. 11.
Figure 13:
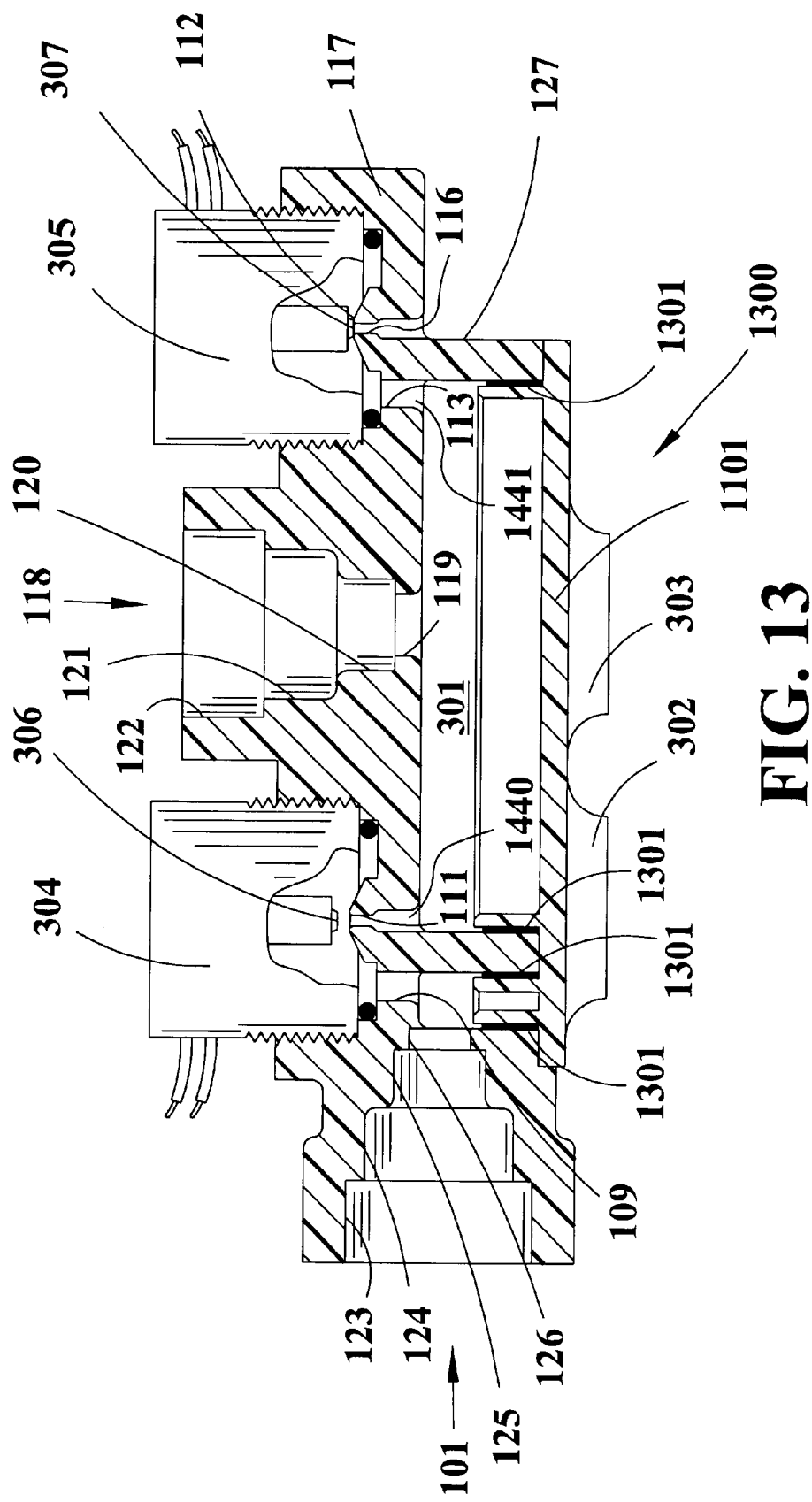
FIG. 13 is a cross-sectional view of the plug portion of the manifold assembly ultrasonically welded to the manifold portion of the manifold assembly. Solenoids are shown in elevation (i.e., not in cross-section) in the inlet and exhaust housings illustrating the interconnection of the inlet port and the chamber and the supply of air to the supply port.

FIG. 11 is a top view of the plug and FIG. 12 is a cross-sectional view of the plug 1101 taken along the lines 12—12 of FIG. 11. FIG. 13 illustrates the plug 1101 welded to the manifold portion 100.

FIG. 13 is a cross-sectional view of the manifold assembly 1300 illustrating the plug portion 1101 ultrasonically welded to the manifold portion 100. Reference numeral 1301 indicates ultrasonic welding. Ultrasonic welding occurs between the interfering surfaces of the plug portion 1101 and the manifold portion 100. The ultrasonic welding occurs uniformly around the rectangular forms of plug 1101 and entirely seals chamber 301. Chamber 301 in FIG. 13 is completely enclosed whereas in FIG. 3 chamber 301 is not enclosed. FIG. 3 does not represent the total assembly. FIG. 13 illustrates solenoids 304, 305 shown in elevation in the inlet and exhaust housings. FIG. 13 illustrates the exhaust solenoid having a valve 307 in closed position to seat upon valve seat 112. Valve 306 on inlet solenoid 304 is in open position to permit air flow through inlet port 101, first passageway 109, inlet housing 107, second air passageway 111, chamber 301 and through supply port 118.

Figure 13A:
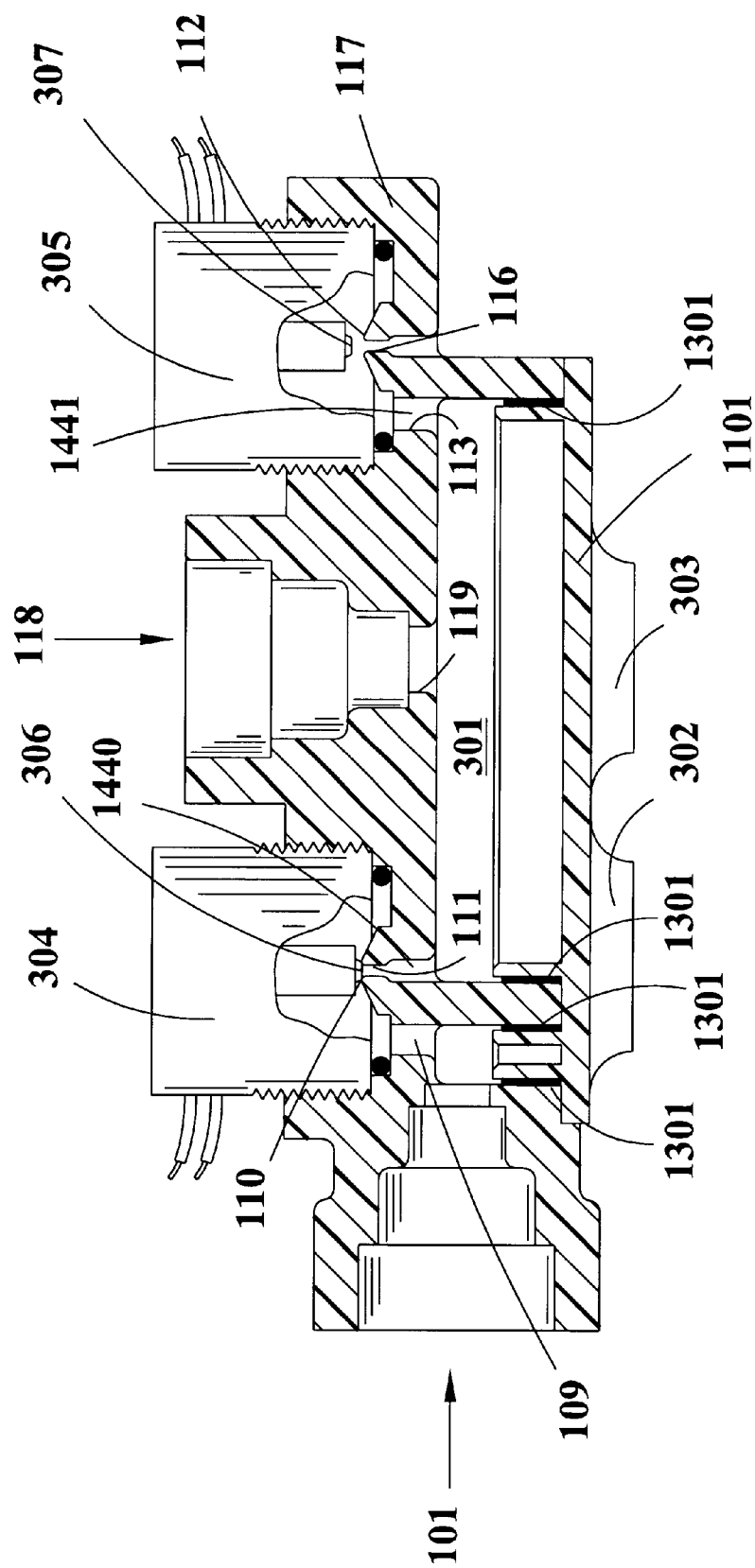
FIG. 13A is a cross-sectional view of the manifold portion of the manifold assembly ultrasonically welded to the plug portion of the manifold assembly. Solenoids are shown in elevation (i.e., not in cross-section) in the inlet and exhaust housings illustrating the exhaust of air from the supply port to the atmosphere.

FIG. 13A is a cross-sectional view of the manifold assembly of FIG. 3 with solenoids 304, 305 shown in elevation in the inlet and exhaust housing 107, 108 illustrating the exhaust of air from the supply port 118 to the atmosphere.

In FIG. 13A, valve 307 is shown in its open position permitting air or other fluid flow from supply port 118 through chamber 301, third passageway 113 and fourth passageway 116. FIG. 13A illustrates valve 306 engaging valve seat 110. Valve 306 is exposed to system pressure but only has to overcome a small force due to the small area of the valve exposed.

Figure 13B:
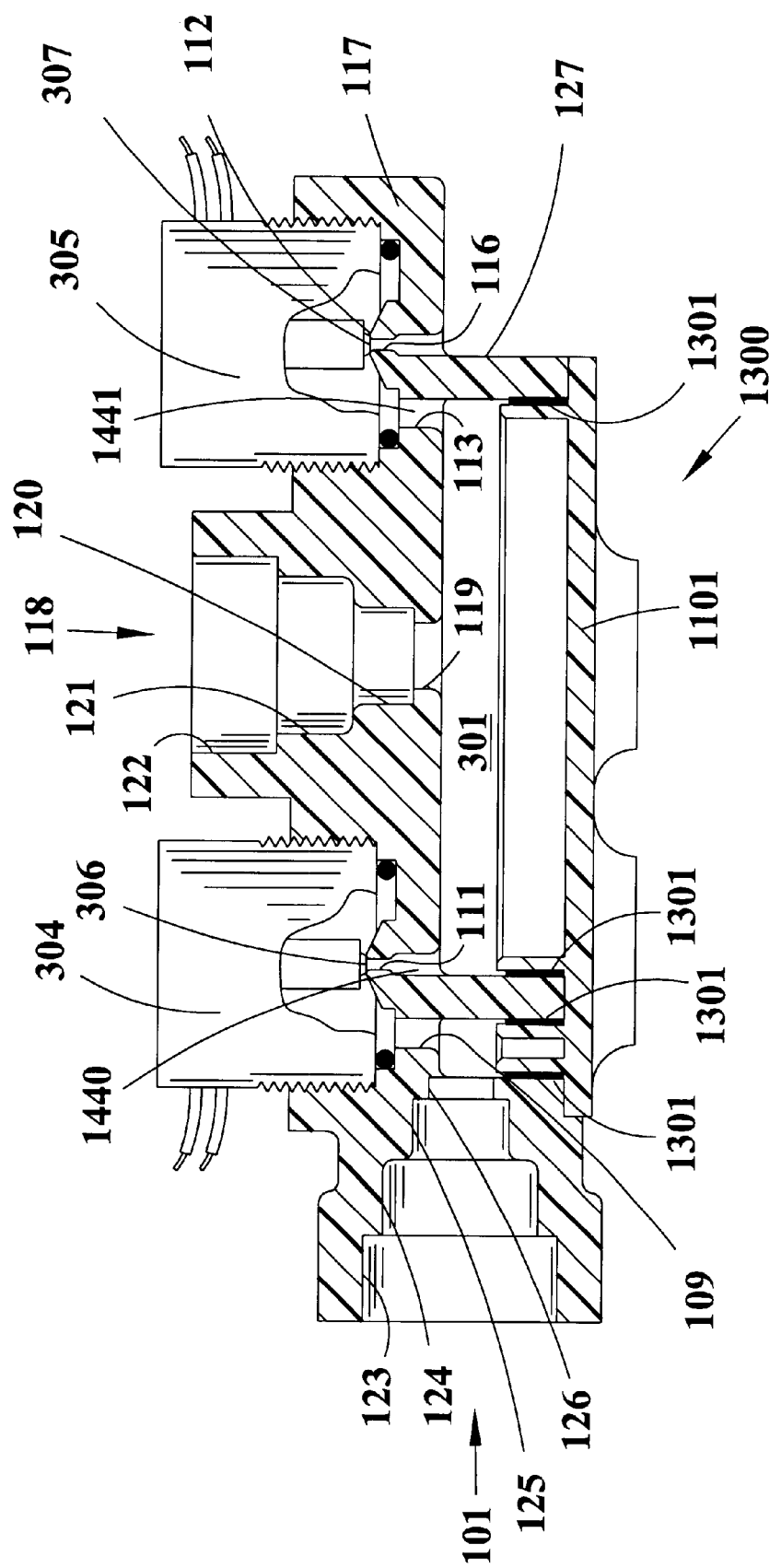
FIG. 13B is a cross-sectional view of the manifold assembly ultrasonically welded to the plug portion of the manifold assembly. Solenoids are shown in elevation (i.e., not in cross-section) in the inlet and exhaust housings illustrating both the inlet solenoid valve and the exhaust solenoid valve in the closed position.
Figure 13C:
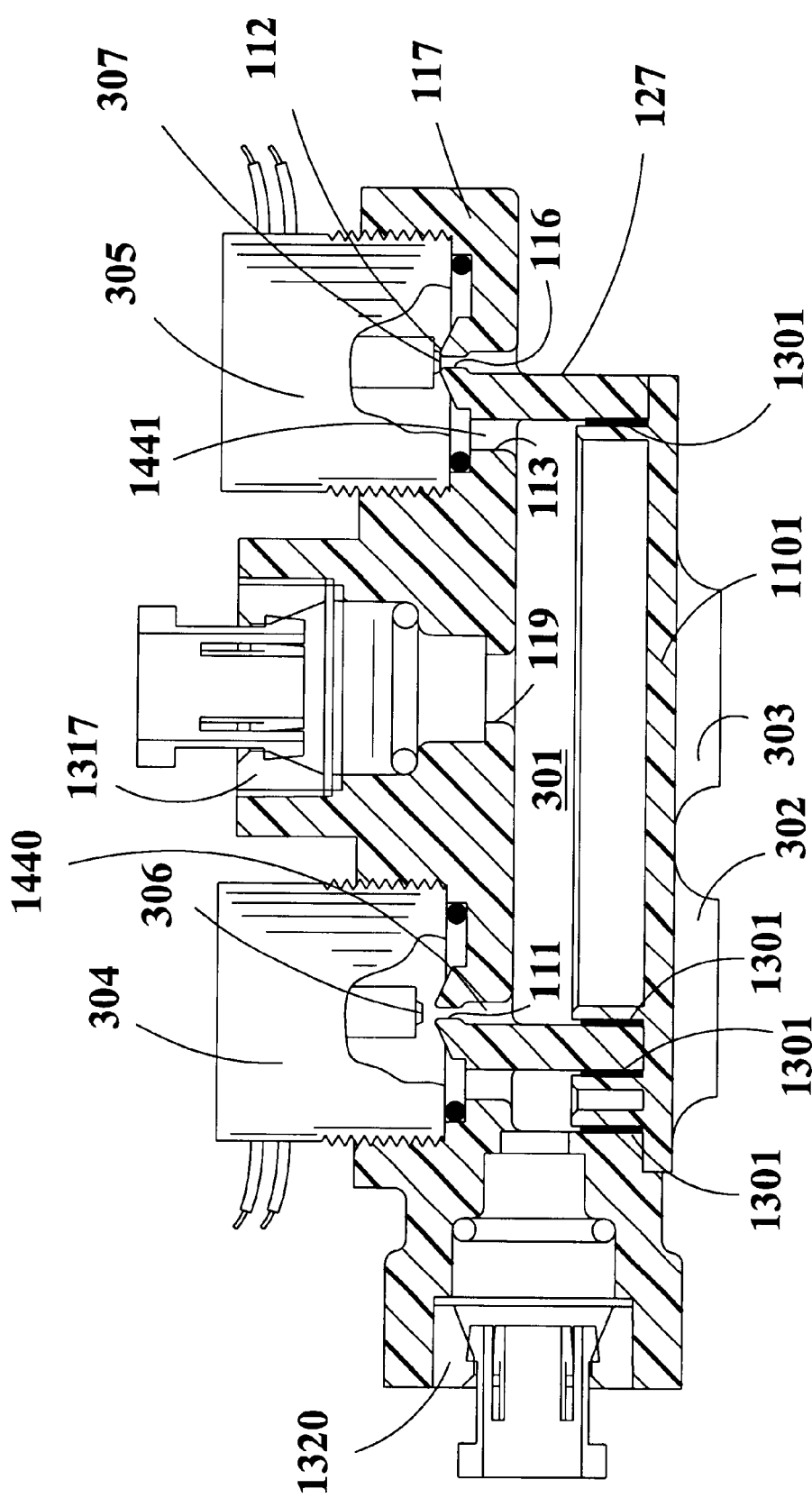
FIG. 13C is a cross-sectional view similar to FIG. 13 only tube connectors are illustrated in the inlet and supply ports.

FIG. 13B illustrates the manifold assembly in the condition where both valves 306, 307 are closed against the pressure in chamber 301. Valve 306 seats against valve seat 110 and only needs to overcome a small force since the area of the valve exposed to pressure is small.

Figure 14:
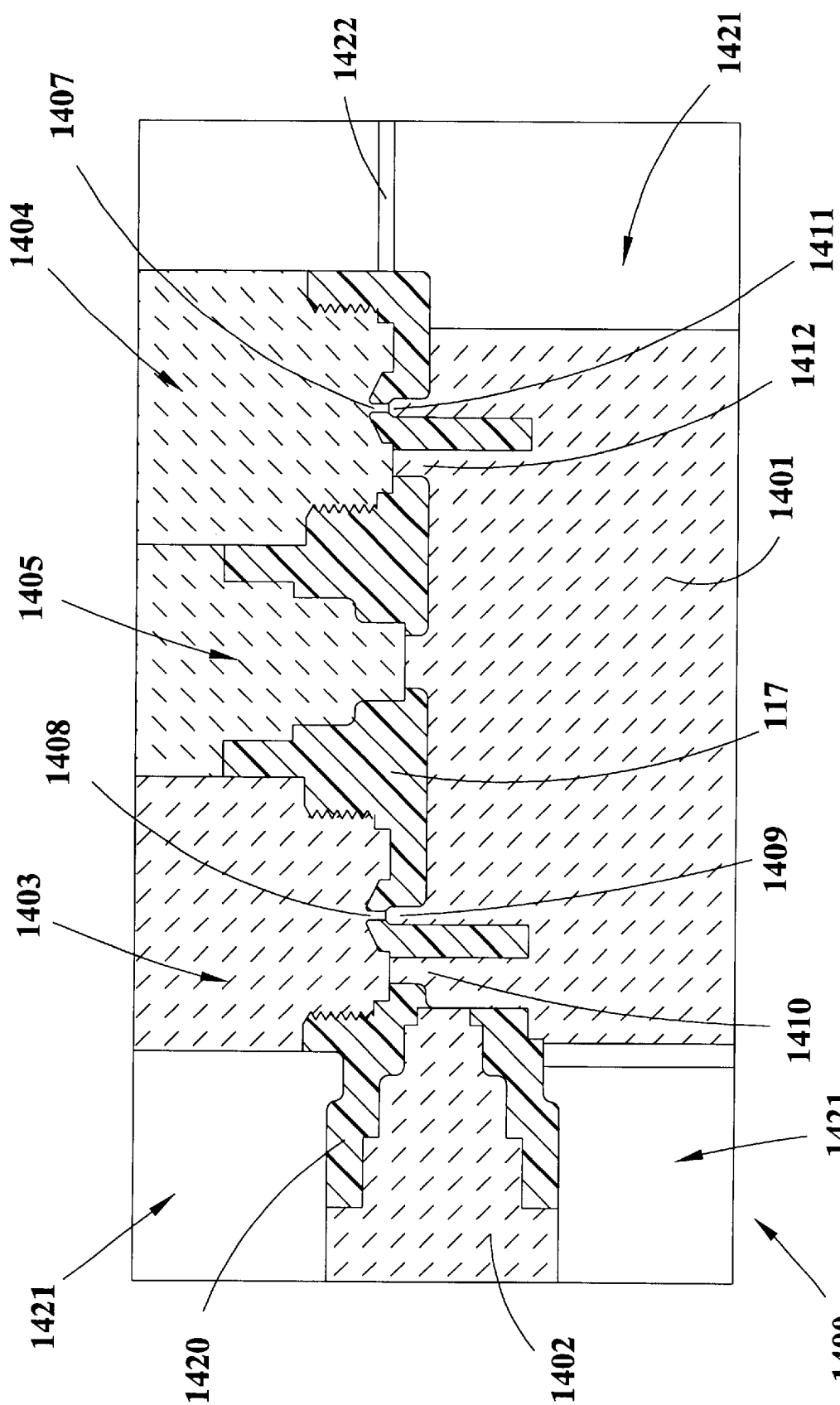
FIG. 14 is a cross-sectional view of the mold for forming the manifold portion (depicted in FIGS. 1–13) of the manifold assembly.

FIG. 3A is an enlarged portion of FIG. 3 illustrating passageway 111 and valve seat 110. Reference numeral 310 represents the diameter of passageway 111 and reference numeral 311 represents the length of the passageway. It is these dimensions that are referred to when length to diameter ratios are discussed. Particularly it is the ratio of the length as represented by numeral 311 to the diameter as represented by reference numeral 310. Referring to FIG. 14, when the ratio of length 311 to diameter 310 is 4.0 or less, then pin portions 1407 and 1408 will have the strength and rigidity to withstand the forces generated by both mold injection and clamping pressures, typically at least 10,000 psig and 4000 psig, respectively.

Referring to FIG. 12 reference numeral 1102 is a concavity in plug 1101. Reference numeral 1103 indicates another concavity in plug 1101. Reference numeral 1105 is a shoulder of the plug 1101, the side of which is ultrasonically welded to the manifold portion 100 of the manifold assembly 1300. The side of shoulder 1106 is similarly ultrasonically welded to the manifold portion of the assembly 100.

Figure 4:
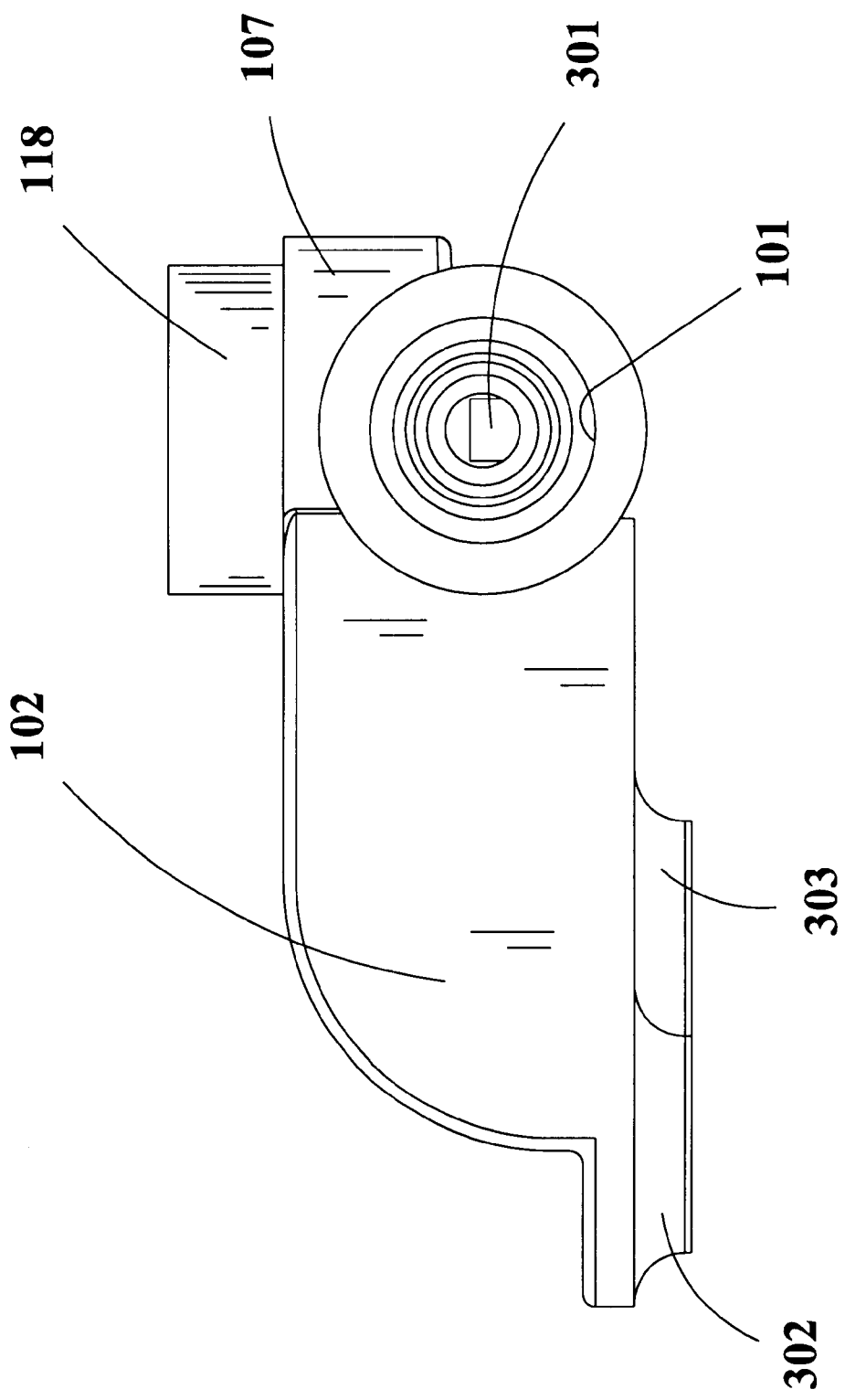
FIG. 4 is a view of the manifold portion of the manifold assembly looking from the air inlet or, put another way, this view is a front view of the manifold portion of the manifold assembly.
Figure 5:
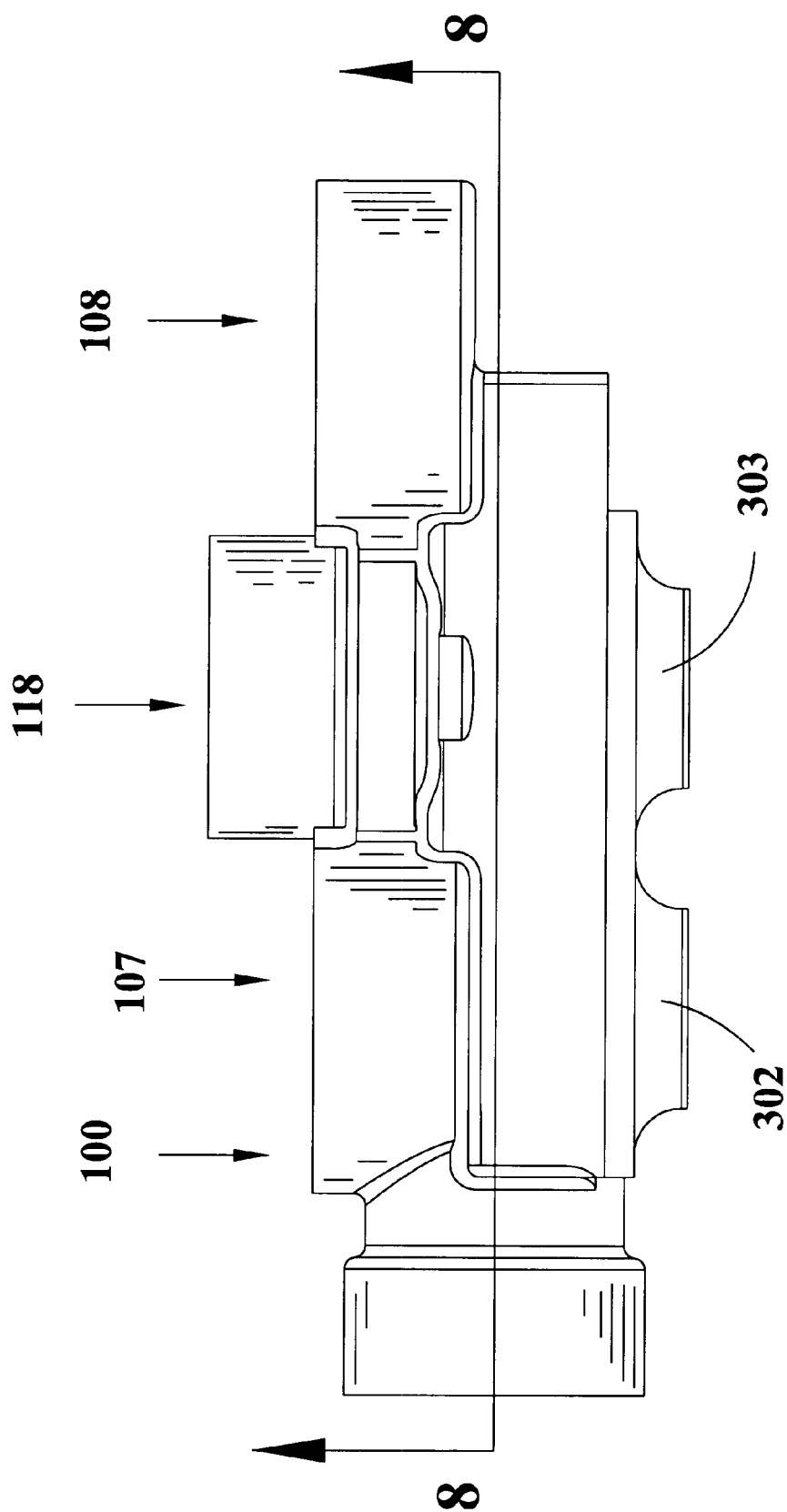
FIG. 5 is a side view of the manifold portion of the manifold assembly.
Figure 6:
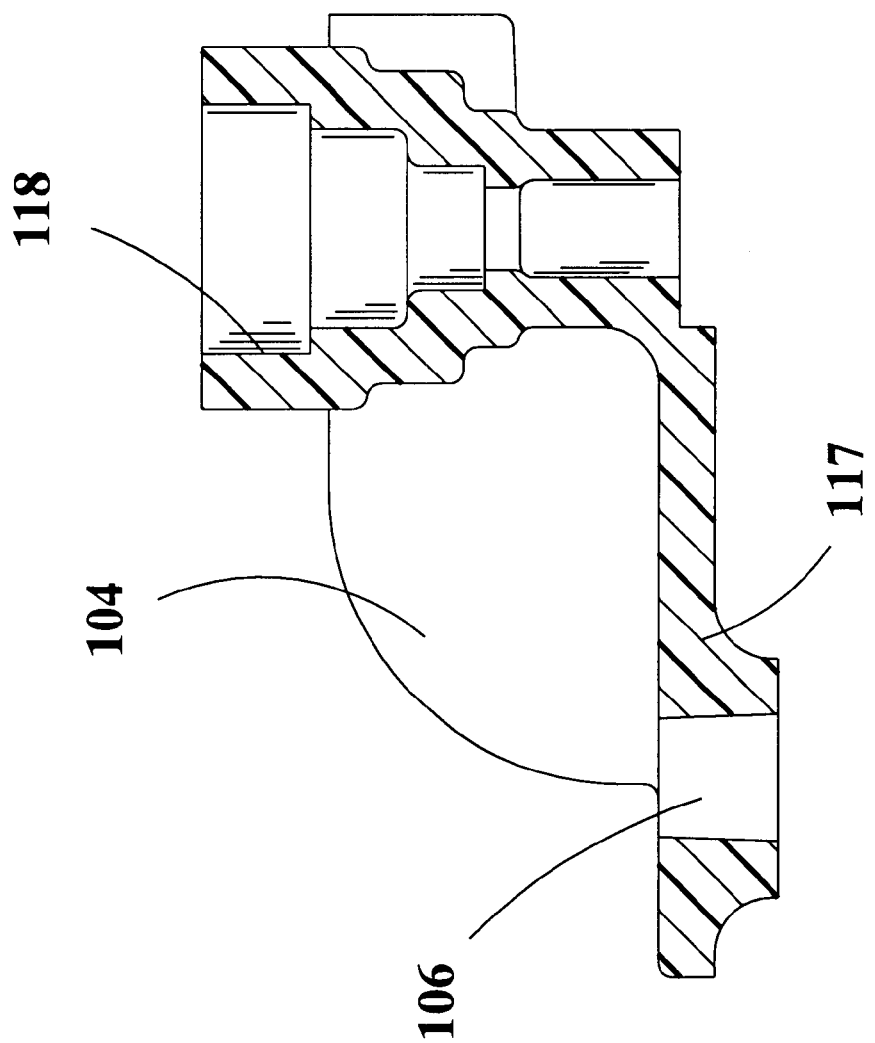
FIG. 6 is a cross-sectional view of the manifold portion of the manifold assembly taken along the lines 6—6 of FIG. 1.

FIG. 4 is a view of the manifold portion looking from the air inlet or put another way this view is a front view of the manifold portion. Chamber 301 can be viewed looking inwardly through the inlet port 101. The concentric circular lines within inlet port 101 are radiuses and shoulders as will be understood by those skilled in the art when viewing FIG. 3. FIG. 5 is a side view of the manifold portion. FIG. 6 is a cross-sectional view of the manifold portion taken along the lines 6—6 of FIG. 1.

Figure 7:
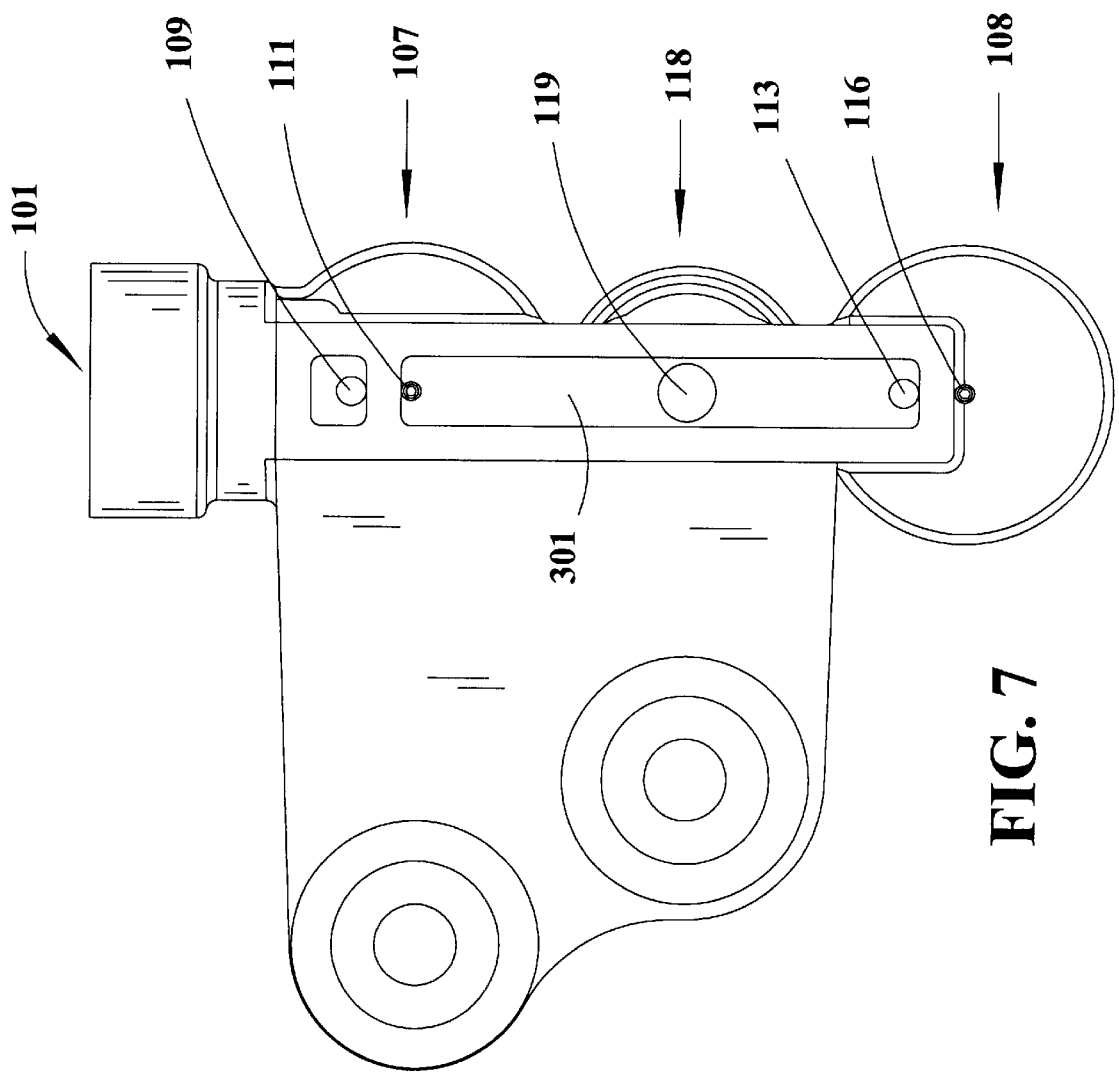
FIG. 7 is a bottom view of the manifold portion of the manifold assembly.

FIG. 7 is a bottom view of the manifold portion of the assembly. Passageways 109, 111, 113 and 116 are viewed from the bottom as is chamber 301.

Figure 8:
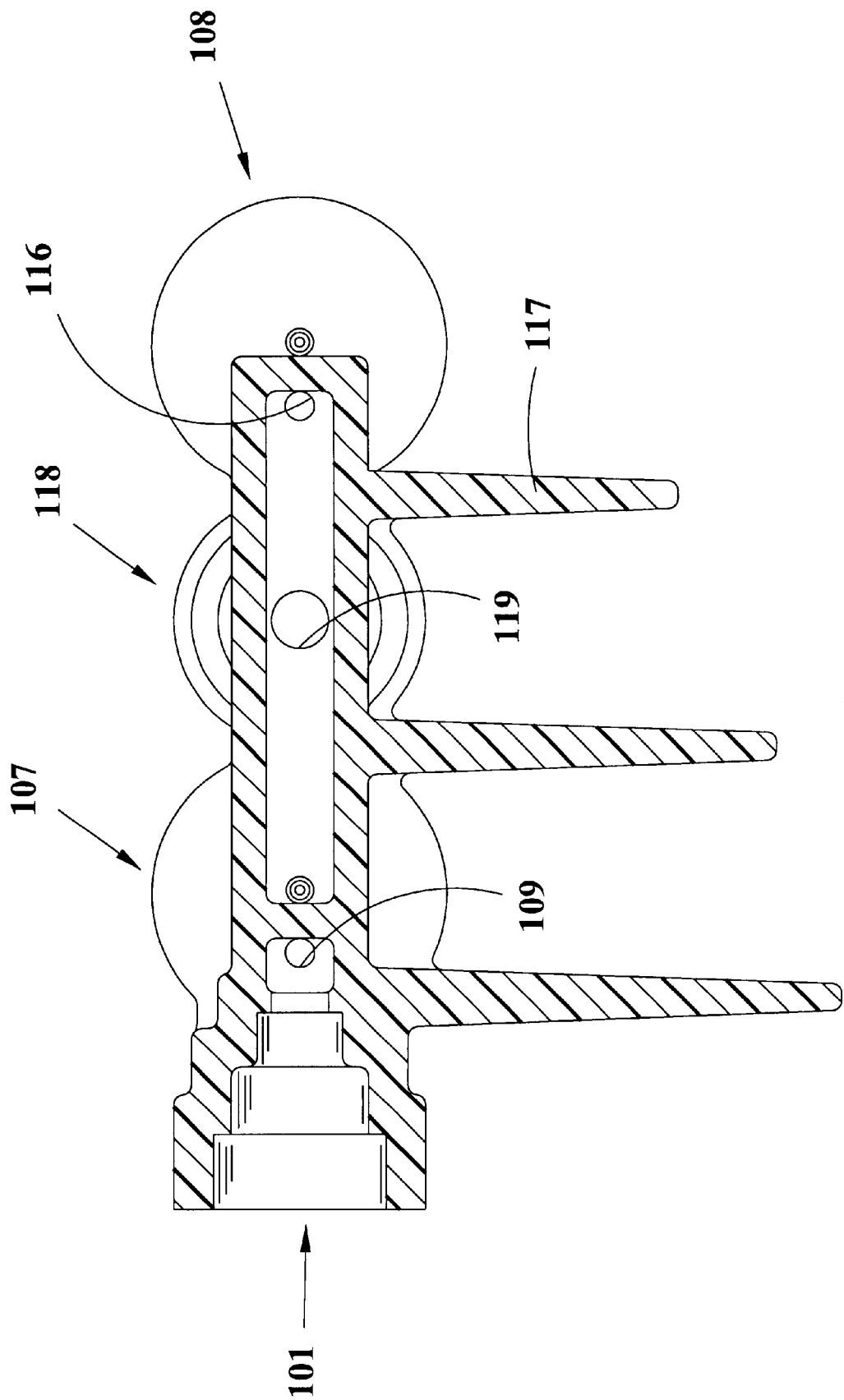
FIG. 8 is a cross-sectional view of the manifold portion of the manifold assembly taken along the lines 8—8 of FIG. 5.

FIG. 8 is a cross-sectional view of the manifold portion taken along the lines 8—8 of FIG. 6. Again, the passageways 109 and 116 can be viewed from FIG. 8.

Figure 9:
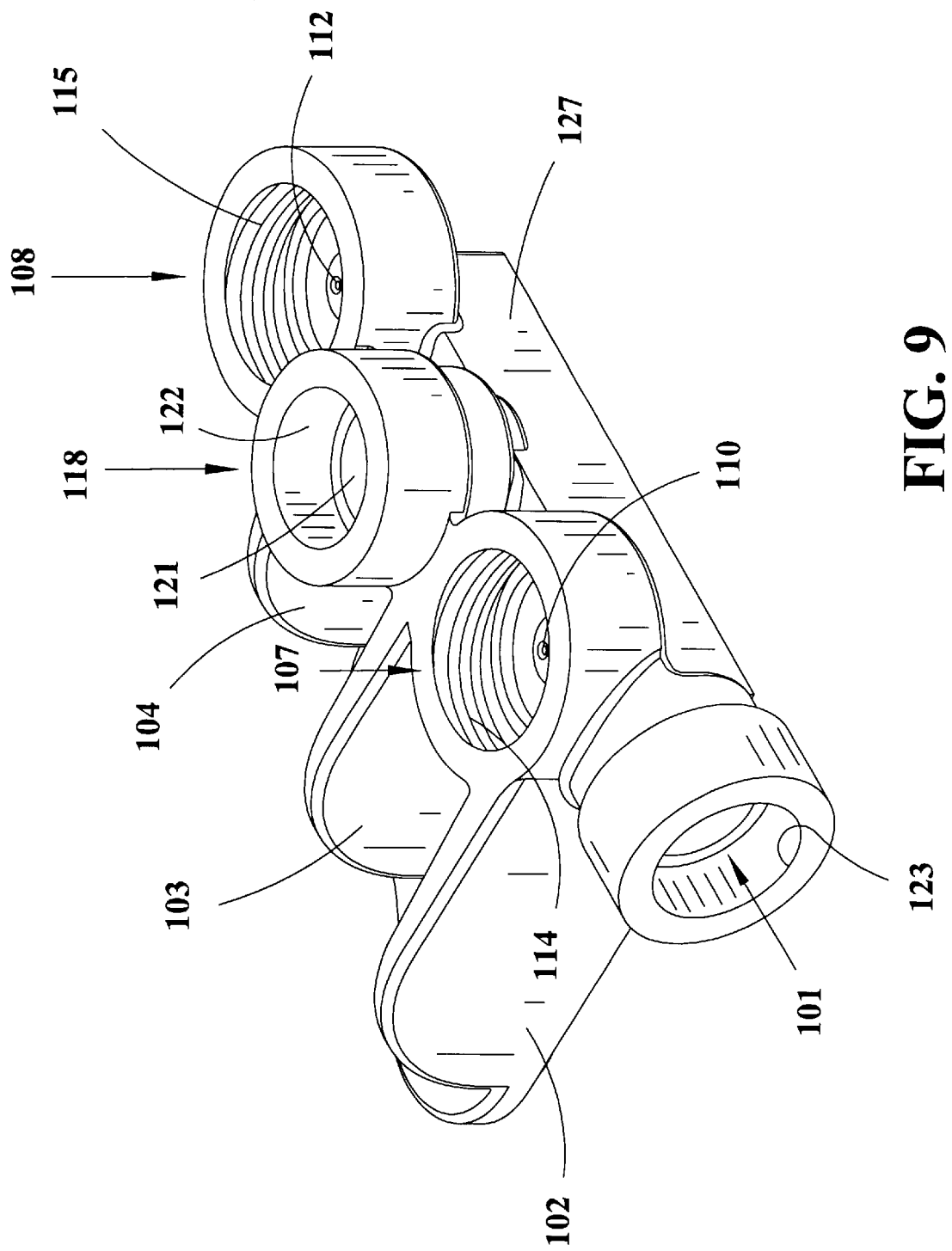
FIG. 9 is a perspective view of the manifold portion of the manifold assembly.
Figure 10:
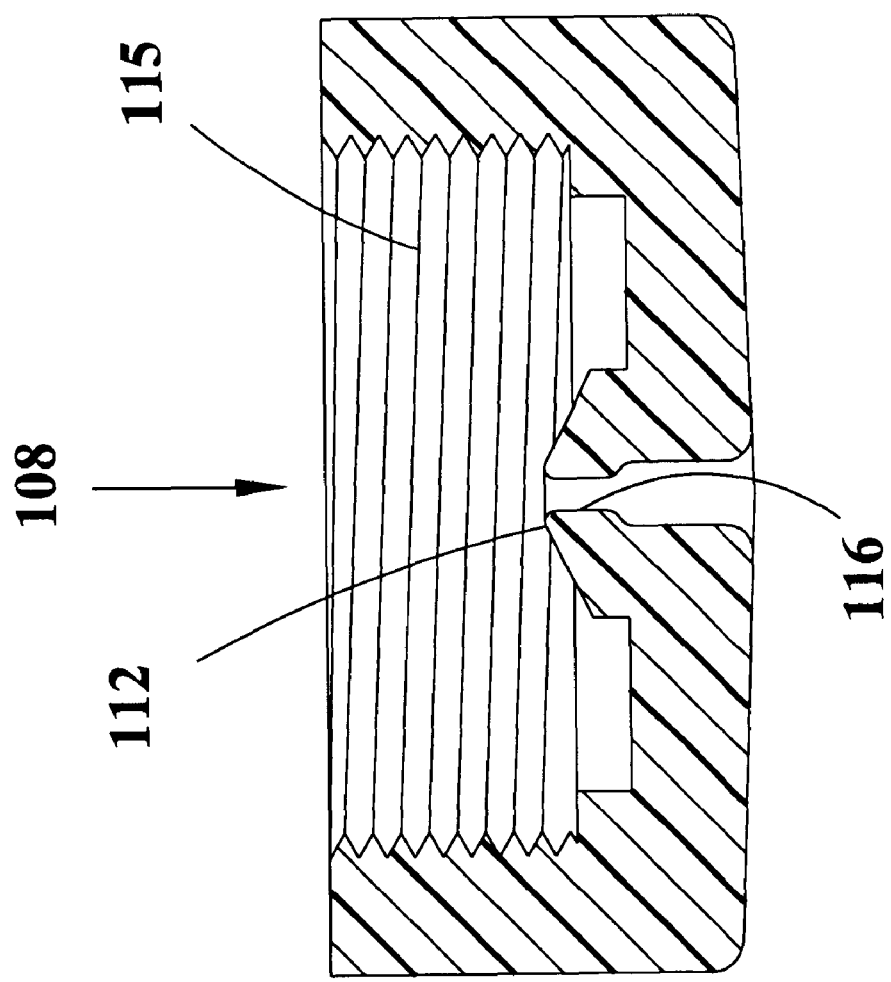
FIG. 10 is a cross-sectional view of the exhaust housing of the manifold portion of the manifold assembly taken along the lines 10—10 of FIG. 1.

FIG. 9 is a perspective view of the manifold. Inlet housing 107, supply port 118, and exhaust housing 108 are viewed well in FIG. 9. Valve seats 110 and 112 are also illustrated well in this view. FIG. 10 is a cross-sectional view of the exhaust port of the manifold portion of the assembly taken along the lines 10—10 of FIG. 1.

FIG. 14 is a cross-sectional view of the mold forming the manifold portion of the assembly. Reference numeral 1400 indicates the mold generally. The mold is comprised of a bottom core portion 1401, an inlet portion 1402, a first rotatable core 1403, a second rotatable core 1404, a left-half slide portion 1421 of the mold, a right-half slide portion (not shown), and a top portion 1405. The mold portions form a cavity 1420 which is filled with plastic to create the manifold portion. The first rotatable core 1403 includes a pin portion 1408 for forming second passageway 111. The second rotatable core 1404 includes a pin portion 1407 for forming fourth passageway 116. The bottom core portion 1401 of the mold includes a pin portion 1409 which together with pin portion 1408 of the first rotatable mold 1403 forms second passageway 111 and an opening 1440 which communicates with chamber 301. The bottom core portion of the mold 1401 includes a pin portion 1411 which together with pin portion 1407 of the second rotatable mold 1404 forms a fourth passageway 116 and an opening 1441 which communicates with the atmosphere external to the manifold assembly. Pin portions 1410 and 1412 form passageways 109 and 113 in the manifold portion of the assembly, respectively. The use of the bottom core portion of the mold in conjunction with the rotatable cores 1403 and 1404 enable the formation of small diameter passageways 111 and 116. In this way, passageways having a length to diameter ratio of 4.0 or less are formed. This enables the reliable formation of manifold portions of the assembly having small diameter passageways and orifices. This avoids the deficiencies of the prior art where metal rods and pins, having length to diameter ratios of more than 4.0, are used in a one piece mold system. After injection of the polymer in the prior art, the rods and pins are removed through access ports which subsequently have to be filled and sealed. The small in cross-section passageways and orifices create small forces acting upon plunger seals that seat against the valve seats which are formed by this molding process. The plunger seals are, in effect, valves.

Rotatable core portions 1403 and 1404 include threads thereon which enable the formation of threads in the molding process. The core portions are rotated away from the molding. This leaves the valve seats, threads, and O-ring sealing surfaces within the solenoid housings free of mold parting line mismatch and/or flash, thereby ensuring proper sealing of the housing when the solenoids are threaded into the housings.

Once the mold is assembled together, a polymer is injected into the cavity. The mold is held together by means known in the industry. A polymeric resin such as Delrin® or Celcon® may be used but many other polymers (plastics) may be used. Celcon® is a registered trademark of Celanese Corporation. The molding is then allowed to cool. The rotatable mold portions 1403, 1404 are rotated away from the molding and removed therefrom. The inlet mold portion is removed. The left 1421 and right 1530 slide portions of the mold are separated. Finally, the top core portion 1405 and bottom core portion 1401 of the mold are removed. Once the manifold portion is ejected from the mold, a plug 1101 is ultrasonically welded thereto as illustrated in FIG. 13.

Figure 15:
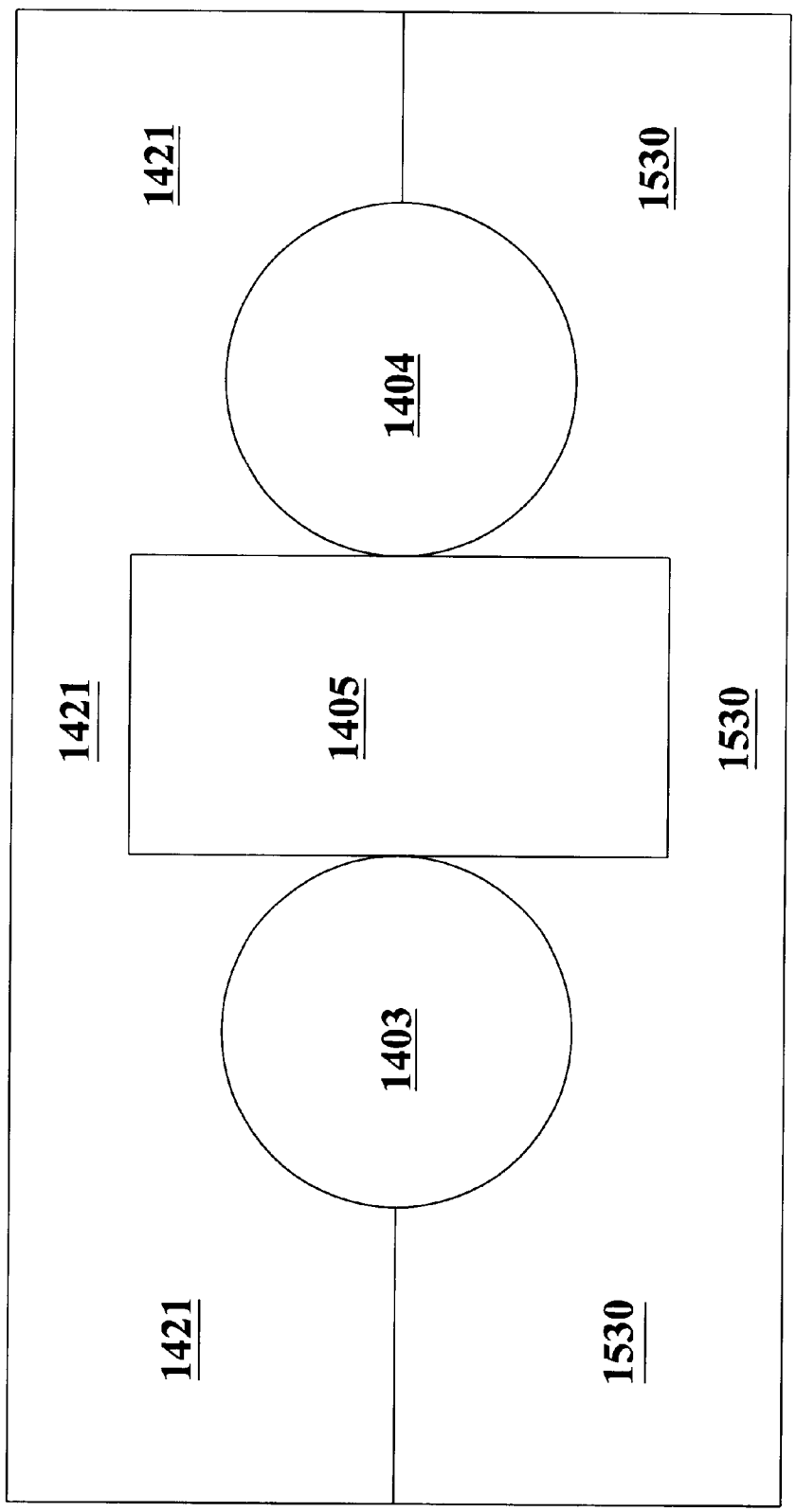
FIG. 15 is a top view of the mold for forming the manifold portion (depicted in FIGS. 1–13) of the manifold assembly.

FIG. 15 is a top view of the mold for forming the manifold portion (depicted in FIGS. 1–13) of the manifold assembly. Left 1421 and right 1530 slide portions of the mold are separated by pulling (or sliding) them apart.

Figure 16:
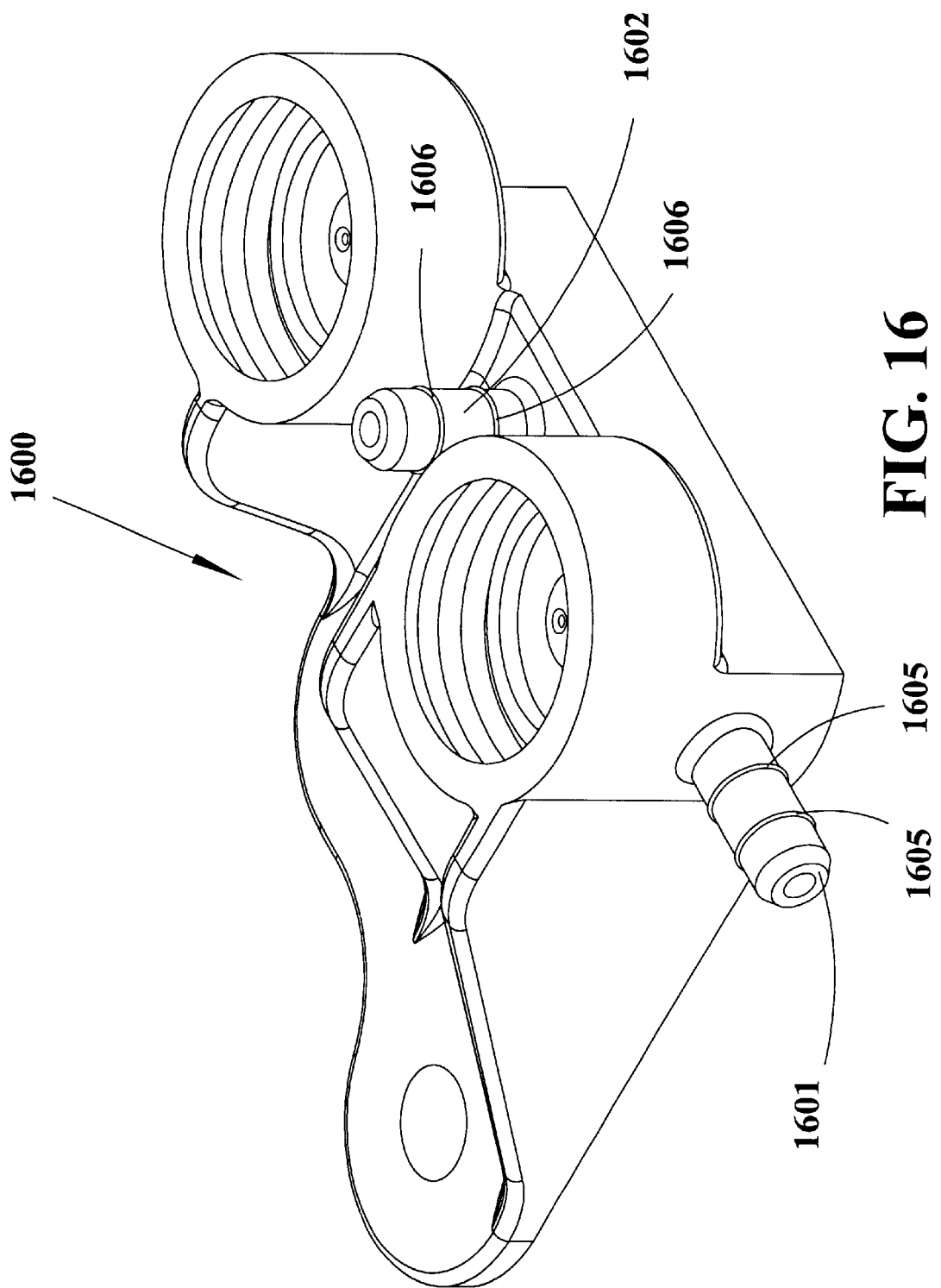
FIG. 16 is a perspective view of the manifold portion of another embodiment of the manifold assembly which includes an inlet connector and a supply connector.
Figure 17:
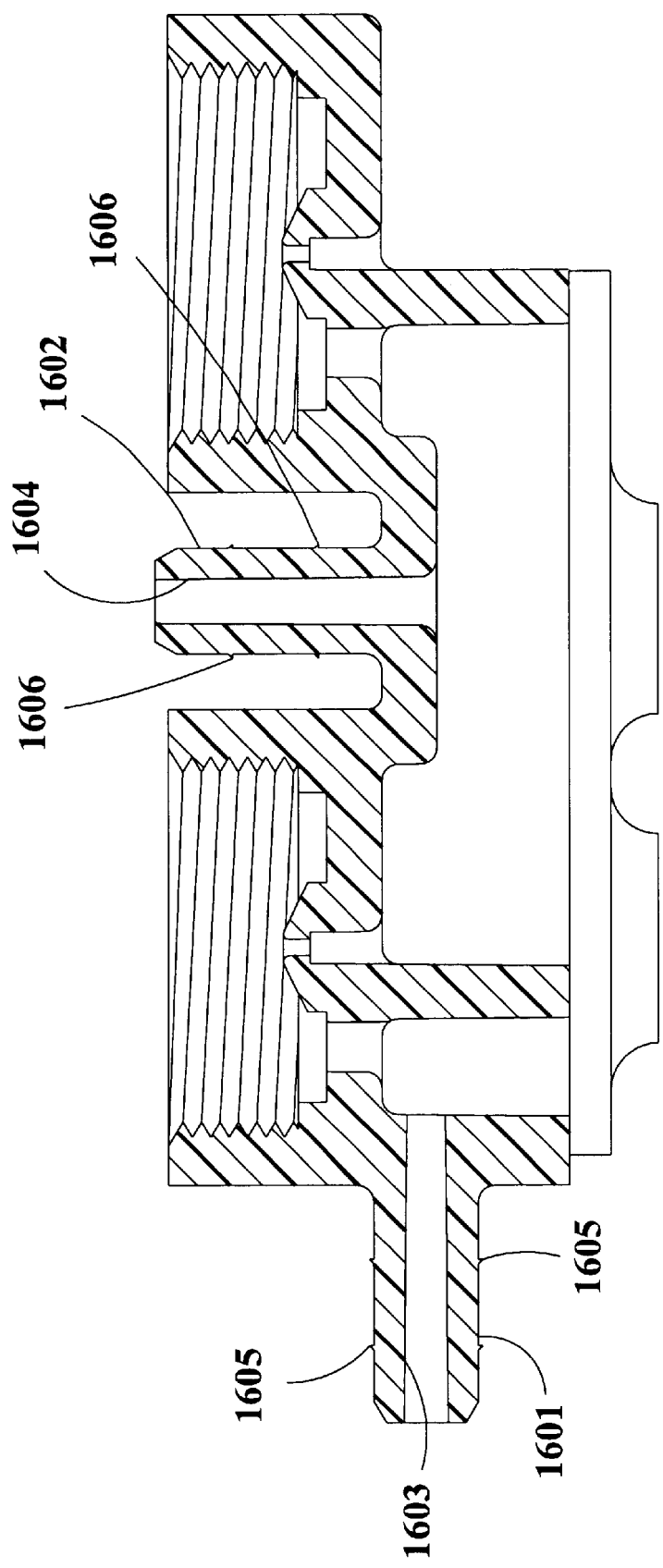
FIG. 17 is a cross-sectional view of the manifold portion of the embodiment of FIG. 16 of the manifold assembly.
Figure 18:
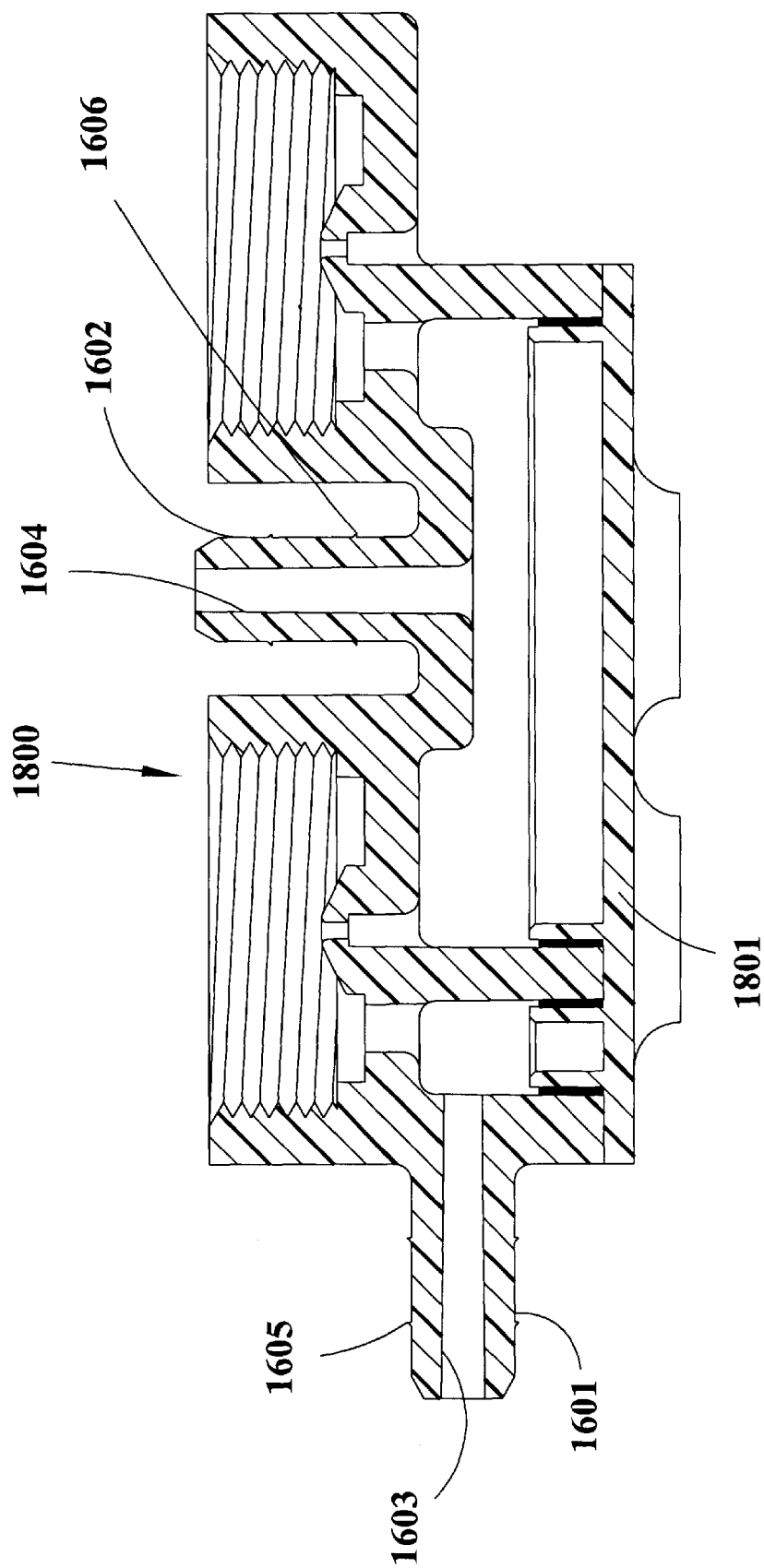
FIG. 18 is a cross-sectional view of the manifold portion of the embodiment of FIG. 16 ultrasonically welded to the plug portion.

FIG. 16 is a perspective view of the manifold portion 1600 of another embodiment of the manifold assembly which includes an inlet connector 1601 and a supply connector 1602. Connectors 1601 and 1602 enable flexible tubes to be connected thereto. Connector 1601 includes a passageway 1603 therethrough and connector 1602 includes a passageway 1604 therethrough. These passageways conduct air or fluid therethrough as required by the application of the manifold assembly. Barbs 1605 are on the outer periphery of inlet connector 1601 and function so as to resist extraction of a flexible tube placed over the barbs. Similarly, barbs 1606 are on the outer periphery of supply connector 1602 and function so as to resist extraction of a flexible tube placed over the barbs. FIG. 17 is a cross-sectional view of the manifold portion 1600 of the manifold assembly 1800 illustrated in FIG. 18. FIG. 18 is a cross-sectional view of the manifold portion of the embodiment of FIG. 16 ultrasonically welded to the plug portion 1801.

The invention has been described herein with specificity. Those skilled in the art will recognize that many changes may be made to the invention without departing from the spirit and scope of the claims which are appended hereto.

We claim:

1. A manifold comprising a body having an inlet port; an inlet housing; a supply port, an exhaust housing, and a chamber interconnecting said inlet housing, said supply port and said exhaust housing; a first passageway interconnecting said inlet port to said inlet housing; a second passageway interconnecting said exhaust housing to the atmosphere external to said manifold; said chamber being formed by a plug ultrasonically welded to said manifold; an inlet solenoid having a plunger residing in said inlet housing and an exhaust solenoid having a plunger residing in said exhaust housing; and, said inlet housing includes a first valve seat and said exhaust housing includes a second valve seat; and, said plunger of said inlet solenoid being engageable with said first valve seat and said plunger of said exhaust solenoid being engageable with said second valve seat.

2. A manifold as claimed in claim 1 further comprising a first tube connector affixed to said inlet port and a second tube connector affixed to said supply port.

3. A manifold as claimed in claim 1 wherein said body is comprised of a polymer.

4. A manifold assembly comprising a body having an inlet connector; an inlet housing; a supply connector; an exhaust housing; a plug ultrasonically welded to said body forming a chamber; said inlet and supply connectors each comprising a nipple with a passageway therethrough; said inlet connector interconnected to said inlet housing by a first passageway; said inlet housing interconnected with said chamber by a second passageway; said outlet exhaust housing interconnected with said chamber by a third passageway; and, said outlet exhaust housing interconnected with the atmosphere external to said manifold assembly by a fourth passageway.

5. A manifold assembly as claimed in claim 4 wherein each connector includes barbs on the periphery thereof.

* * * * *